(12) United States Patent
Kouda

(10) Patent No.: US 7,661,725 B2
(45) Date of Patent: Feb. 16, 2010

(54) COUPLING AND SOCKET THEREOF

(75) Inventor: Toru Kouda, Ohta-ku (JP)

(73) Assignee: Nitto Kohki Co., Ltd., Tokyo (JP)

( * ) Notice: Subject to any disclaimer, the term of this patent is extended or adjusted under 35 U.S.C. 154(b) by 458 days.

(21) Appl. No.: 11/809,724

(22) Filed: Jun. 1, 2007

(65) Prior Publication Data

US 2008/0001395 A1    Jan. 3, 2008

(30) Foreign Application Priority Data

Jun. 2, 2006   (JP) ............................. 2006-154523

(51) Int. Cl.
*F16L 37/18* (2006.01)

(52) U.S. Cl. ..................... 285/316; 285/276; 285/307; 285/318

(58) Field of Classification Search ................. 285/13, 285/276, 277, 307, 308, 315, 316, 317, 318, 285/397, 924; 403/322.2; 137/614.03, 614.05
See application file for complete search history.

(56) References Cited

U.S. PATENT DOCUMENTS

| | | | |
|---|---|---|---|
| 2,708,589 A | | 5/1955 | Masck |
| 4,859,110 A | * | 8/1989 | Dommel .................... 403/325 |
| 5,255,714 A | | 10/1993 | Mullins |
| 5,323,812 A | | 6/1994 | Wayne |
| 5,482,083 A | * | 1/1996 | Jenski .................. 137/614.03 |
| 6,779,778 B2 | * | 8/2004 | Kuwabara ................ 251/149.9 |
| 2006/0284418 A1 | | 12/2006 | Kohda |

\* cited by examiner

*Primary Examiner*—Daniel P Stodola
*Assistant Examiner*—Gwendolyn Fournet
(74) *Attorney, Agent, or Firm*—Brinks Hofer Gilson & Lione

(57) ABSTRACT

A coupling has a socket and a plug that is inserted into and connected to the socket. The socket has a locking element and a sleeve actuating element that are radially displaceable to lock the plug as inserted into the socket. A sleeve is provided over the outer peripheral surface of the socket. The inner peripheral surface of the sleeve has a locking surface that presses the locking element from the radially outer side into a lock position. Further, the inner peripheral surface of the sleeve has an inclined surface extending in the circumferential direction thereof. As the plug is progressively inserted into the socket, the sleeve actuating element is pushed radially outward by the plug while engaging the inclined surface, causing the sleeve to be displaced in the circumferential direction. Thus, the inclined surface radially aligns with the locking element, and the locking element is pushed radially outward while engaging the inclined surface by the plug inserted progressively. When the plug has been inserted into the socket by a predetermined length, the locking element and the sleeve actuating element are received in a groove provided on the outer surface of the plug, resulting in disengagement from the inclined surface. Consequently, the sleeve is returned to the initial position to hold the locking element from the radially outer side, thereby locking the plug in the socket.

16 Claims, 8 Drawing Sheets

US 7,661,725 B2

COUPLING AND SOCKET THEREOF

This application claims priority under 35 U.S.C. § 119 to Japanese Patent Application No. JP2006-154523 filed Jun. 2, 2006, the entire content of which is hereby incorporated by reference.

FIELD OF THE INVENTION

The present invention relates to a coupling comprising a socket and a plug. More particularly, the present invention relates to a pipe coupling of the type that enables a plug to be connected to a socket simply by inserting the former into the latter, and also relates to a socket for use in such a coupling.

DESCRIPTION OF THE RELATED ARTS

Conventional pipe couplings of the type described above include a pipe coupling proposed by the present applicant and disclosed in Japanese Patent Application Publication No. 2005-90669.

The pipe coupling disclosed in the above-mentioned JP application publication has a tubular socket, a plug that is removably inserted into the socket, and a sleeve slidably fitted on the outer peripheral surface of the socket.

In the above-described pipe coupling, the socket has a first through-hole radially displaceably receiving a rear ball (locking element) and a front ball-accommodating hole (second through-hole) radially displaceably receiving a front ball (sleeve actuating element). When inserted into the socket, the plug firstly pushes the front ball radially outward while engaging it with an inclined surface formed on the inner peripheral surface of the sleeve, thereby displacing the sleeve axially rearward, and thus causing the inclined surface to be displaced to a position where the rear ball is present. In this state, the rear ball is pushed radially outward in engagement with the inclined surface by the plug inserted progressively. Thus, the plug is inserted while pushing the front and rear balls radially outward. When the plug has been inserted to a predetermined position, the front and rear balls are received in a locking recess provided on a cylindrical outer surface of the plug, resulting in the rear ball disengaging from the inclined surface. Consequently, the sleeve is returned to the initial position by a spring. The returned sleeve holds the rear ball from the radially outer side to keep the plug in connection with the socket.

To pull the plug out of the socket, the sleeve is displaced axially rearward until the inclined surface aligns with the rear ball, and the plug is forced to pull out of the socket. At this time, the inclined surface cannot keep the rear ball from being pushed radially outward from the locking recess of the plug. Thus, the plug is pulled out of the socket.

The amount of axially rearward displacement of the sleeve for enabling the plug to be pulled out of the socket is equal to the amount of axially rearward displacement of the sleeve by the engagement of the front ball with the inclined surface, which is small. That is, the axially rearward displacement is short.

The sleeve is likely to be accidentally displaced in the axial direction. Therefore, the above-described pipe coupling according to the related art involves the problem that the plug is likely to accidentally disengage from the socket.

SUMMARY OF THE INVENTION

Accordingly, an object of the present invention is to provide a coupling free from the above-described problem with the related art and also provide a socket for use in the coupling.

The present invention provides a coupling comprising a socket (denoted by reference numeral 10 in the following embodiment) and a plug (30) that is inserted into and connected to the socket. The socket (10) has a tubular plug-receiving part (11) extending rearward from the forward end adapted to receive the plug. The plug-receiving part (11) has an inner peripheral surface and an outer peripheral surface. The socket further has a sleeve actuating element-accommodating hole (front ball-receiving hole 13a in the embodiment) extending through the plug-receiving part in the radial direction thereof. A sleeve actuating element (front ball 12a in the embodiment) is accommodated in the sleeve actuating element-accommodating hole (13a) displaceably in the radial direction. A locking element-accommodating hole (rear ball-receiving hole 13b in the embodiment) extends through the plug-receiving part in the radial direction at a position closer to the rear end of the socket (10) than the sleeve actuating element-accommodating hole (13a). A locking element (rear ball 12b in the embodiment) is accommodated in the locking element-accommodating hole (13b) displaceably in the radial direction. A sleeve (50) is fitted over the outer peripheral surface of the plug-receiving part. The socket further has an urging member (torsion coil spring 15) that urges the sleeve (50) toward a predetermined position (FIGS. 6, 10 and 18) on the socket. The plug (30) has a push portion (ball push portion 32 in the embodiment) formed on the outer surface of the plug to successively push the sleeve actuating element (12a) and the locking element (12b) radially outward when the plug is inserted into the plug-receiving part (11) of the socket (10). A plug groove (33) is formed on the outer surface of the plug rearwardly adjacent to the push portion (32) in the direction of insertion of the plug to receive the sleeve actuating element (12a) and the locking element (12b). The sleeve (50) has an inner peripheral surface that is slidably engaged with the outer peripheral surface of the plug-receiving part (11). The inner peripheral surface of the sleeve (50) has a locking surface (54c) that, when the sleeve (50) is placed in the predetermined position by the urging member (15), radially aligns and engages with the locking element (12b) to retain it in such a way that a part of the locking element (12b) projects inward from the inner peripheral surface of the plug-receiving part (11). The inner peripheral surface of the sleeve (50) further has a sleeve actuating element-receiving groove (57) having an inclined surface (front ball-receiving groove inclined surface 57a in the embodiment) containing a first portion such that, when the sleeve (50) is placed in the predetermined position (FIGS. 6, 10 and 18) by the urging member (15), the first portion radially aligns with the sleeve actuating element (12a), and a second portion positioned apart from the first portion in a first circumferential direction (Y direction) of the sleeve and radially outward of the first portion. The inclined surface is sloped radially outward from the first portion toward the second portion. In response to the inclined surface being pressed radially outward by the sleeve actuating element (12a), the sleeve (50) is forced to rotate so that the second portion is rotationally displaced toward the sleeve actuating element (12a) in a second circumferential direction (X direction) opposite to the first circumferential direction.

The inner peripheral surface of the sleeve (50) further has a locking element-receiving groove (58) adjacent to the locking surface in the first circumferential direction (Y direction). When the plug (30) is inserted into the plug-receiving part (11) of the socket (10), the push portion (32) pushes the sleeve actuating element (12a) radially outward and presses it against the inclined surface (57a), thereby rotationally displacing the sleeve (50) in the second circumferential direction (X direction), and thus causing the sleeve actuating element (12a) to be displaced from the first portion toward the second portion relative to the inclined surface (57a). While doing so, the push portion (32) further advances in the plug-receiving part (11) to push the locking element (12b) radially outward into the locking element-receiving groove (58). When the plug (30) has been inserted into the plug-receiving part by a predetermined length, the locking element (12b) and the sleeve actuating element (12a) are received in the plug groove (33), thereby allowing the sleeve (50) to be returned to the predetermined position (FIGS. 10 and 18) by the urging member (15).

In this coupling, it is necessary in order to remove the plug from the socket to rotate the sleeve in the second circumferential direction (X direction) so that the locking element-receiving groove (58) radially aligns with the locking element (12b). The displacement of the sleeve in the circumferential direction is less likely to occur than the displacement thereof in the axial direction. Accordingly, the likelihood of the plug accidentally falling out of the socket reduces as compared to the above-described related art.

Specifically, the locking element-receiving groove (58) may have an edge that extends in the direction of insertion of the plug (30) to define a boundary between the locking element-receiving groove and the locking surface (54c), so that when the sleeve (50) has been displaced in the second circumferential direction (X direction) by the sleeve actuating element (12a), the locking element (12b) is pushed radially outward and pressed against the edge of the locking element-receiving groove (58) by the push portion (32) of the plug (30) so as to enter the locking element-receiving groove (58) while further displacing the sleeve (50) in the second circumferential direction (X direction).

Alternatively, the arrangement may be as follows. The sleeve actuating element-receiving groove (57') has an end wall surface (front ball-receiving groove end wall portion 57'b in the embodiment) that extends in the circumferential direction of the sleeve (50) and that rises from the inclined surface (57'a) to the inner peripheral surface of the sleeve (50). The locking element-receiving groove (58') is offset from the locking element (12b) in a direction opposite to the direction of insertion of the plug (30) when the sleeve (50) is placed in the predetermined position by the urging member (15). When the plug is inserted into the socket, the push portion (32) pushes the sleeve actuating element (12a) radially outward, so that the sleeve actuating element presses the inclined surface (57'a) to rotate the sleeve (50) in the second circumferential direction (X direction) and also presses the end wall surface (57'b) to move the sleeve (50) in the direction of insertion of the plug (30). When the sleeve (50) has been moved in the second circumferential direction (X direction) and in the plug insertion direction by the sleeve actuating element (12a), the locking element (12b) is pressed radially outward by the push portion (32) and pushed into the locking element-receiving groove (58').

With the above-described arrangement, when the plug is to be removed from the socket, the sleeve is rotated in the second circumferential direction (X direction) to align the locking element-receiving groove (58') with locking element (12b) in the plug insertion direction, and thereafter, the sleeve is moved in the plug insertion direction (Z2 direction) to align the locking element-receiving groove (58') with the locking element in the radial direction, thereby allowing the plug to be removed from the socket. It will be understood from this that in this coupling the likelihood of the plug accidentally falling out of the socket further reduces.

In this case, the locking element-receiving groove (58') may have a first edge that extends in the plug insertion direction to define a boundary between the locking element-receiving groove and the locking surface (54c), so that when the sleeve (50) has been moved in the second circumferential direction (X direction) and in the plug insertion direction (Z direction) by the sleeve actuating element (12a), the locking element (12b) is pushed radially outward and pressed against the first edge of the locking element-receiving groove (58') by the push portion (32) of the plug (30) so as to enter the locking element-receiving groove (58') while further displacing the sleeve (50) in the second circumferential direction (X direction).

More specifically, the locking element-receiving groove (58') may have an end wall surface (rear ball-receiving groove end wall portion 58'b in the embodiment) extending in the circumferential direction of the sleeve at a position forward of the end wall surface of the sleeve actuating element-receiving groove (57') in the plug insertion direction, and a second edge (radially inner edge of the rear ball-receiving groove end wall portion 58' in the embodiment) that defines a boundary between the end wall surface (58'b) and the inner peripheral surface of the sleeve, so that when the sleeve (50) has been moved in the second circumferential direction (X direction) and in the plug insertion direction (Z direction) by the sleeve actuating element (12a), the locking element (12b) pressed by the push portion (32) presses the first and second edges of the locking element-receiving groove (58') and enters the locking element-receiving groove (58') while displacing the sleeve (50) in the plug insertion direction and in the second circumferential direction.

Further, the coupling according to the present invention may be arranged as follows. The sleeve (50) has a relief surface (59: see FIG. 11) that extends from the inner peripheral surface of the sleeve to the forward end of the sleeve and that has a larger radius than that of the inner peripheral surface. The relief surface (59) allows the locking element (12b) and the sleeve actuating element (12a) to be displaced radially outward when the sleeve (50) has been displaced in the plug insertion direction (Z direction), thereby allowing the plug (30) to be pulled out of the socket (10).

The above-described arrangement enables the plug to be pulled out of the socket by displacing the plug in the plug insertion direction. In this case, the length through which the sleeve has to be moved in the plug insertion direction to enable the locking element (12b) and the sleeve actuating element (12a) to be displaced radially outward can be increased independently of the positional relationship between the locking element and the sleeve actuating element, unlike in the foregoing related art. Accordingly, the likelihood of the plug being accidentally pulled out of the socket reduces as compared to the related art.

Specifically, the arrangement may be such that the inner peripheral surface of the sleeve is provided annularly in the circumferential direction of the socket, and the relief surface is provided annularly in the circumferential direction of the socket adjacently to the inner peripheral surface.

In addition, the present invention provides a socket (10) of a coupling which comprises the socket and a plug (30) that is inserted into and connected to the socket. The socket (10) has a tubular plug-receiving part (11) extending rearward from the forward end of the socket to receive the plug. The plug-receiving part has an inner peripheral surface and an outer peripheral surface. The socket further has a sleeve actuating element-accommodating hole (13a) extending through the plug-receiving part in the radial direction thereof. A sleeve actuating element (12a) is accommodated in the sleeve actuating element-accommodating hole (13a) displaceably in the radial direction. A locking element-accommodating hole (13b) extends through the plug-receiving part in the radial direction at a position closer to the rear end of the socket (10) than the sleeve actuating element-accommodating hole (13a). A locking element (12b) is accommodated in the locking element-accommodating hole (13b) displaceably in the radial direction. A sleeve (50) is fitted over the outer peripheral surface of the plug-receiving part. The socket further has an urging member (15) that urges the sleeve (50) toward a predetermined position (FIGS. 6, 10 and 18) on the socket. The plug (30) has a push portion (32) formed on the outer surface of the plug to successively push the sleeve actuating element (12a) and the locking element (12b) radially outward when the plug is inserted into the plug-receiving part (11) of the socket (10). A plug groove (33) is formed on the outer surface of the plug rearwardly adjacent to the push portion (32) in the direction of insertion of the plug to receive the sleeve actuating element (12a) and the locking element (12b). The sleeve (50) has an inner peripheral surface that is in slidably engaged with the outer peripheral surface of the plug-receiving part (11). The inner peripheral surface of the sleeve (50) has a locking surface (54c) that, when the sleeve (50) is placed in the predetermined position by the urging member (15), radially aligns and engages with the locking element (12b) to retain it in such a way that a part of the locking element (12b) projects inward from the inner peripheral surface of the plug-receiving part (11). The inner peripheral surface of the sleeve (50) further has a sleeve actuating element-receiving groove (57) having a first portion that, when the sleeve (50) is placed in the predetermined position (FIGS. 6, 10 and 18) by the urging member (15), radially aligns and engages with the sleeve actuating element (12a) to cause a part of the sleeve actuating element to project radially inward from the inner peripheral surface of the plug-receiving part (11). The sleeve actuating element-receiving groove (57) further has a second portion positioned apart from the first portion in a first circumferential direction (Y direction) of the sleeve and radially outward of the first portion and an inclined surface (57a) sloped radially outward from the first portion toward the second portion. In response to the inclined surface being pressed radially outward by the sleeve actuating element (12a), the sleeve (50) is forced to rotate so that the second portion is rotationally displaced toward the sleeve actuating element (12a) in a second circumferential direction (X direction) opposite to the first circumferential direction. The inner peripheral surface of the sleeve (50) further has a locking element-receiving groove (58) adjacent to the locking surface in the first circumferential direction (Y direction). When the plug (30) is inserted into the plug-receiving part (11) of the socket (10), the sleeve actuating element (12a) is pushed radially outward and pressed against the inclined surface (57a) by the push portion (32) of the plug, thereby rotationally displacing the sleeve (50) in the second circumferential direction (X direction), and thus causing the sleeve actuating element (12a) to be displaced from the first portion toward the second portion relative to the inclined surface (57a). The locking element (12b) is pushed radially outward by the push portion (32) of the plug inserted progressively while pushing the sleeve actuating element (12a) radially outward. When the plug (30) has been inserted into the plug-receiving part by a predetermined length, the sleeve actuating element and the locking element are received in the plug groove (33), thereby allowing the sleeve (50) to be returned to the predetermined position (FIGS. 10 and 18) by the urging member (15).

Specifically, the locking element-receiving groove (58) may have an edge that extends in the direction of insertion of the plug (30) to define a boundary between the locking element-receiving groove and the locking surface (54c), so that when the sleeve (50) has been displaced in the second circumferential direction (X direction) by the sleeve actuating element (12a), the locking element (12b) is pushed radially outward and pressed against the edge of the locking element-receiving groove (58) by the push portion (32) of the plug (30) so as to enter the locking element-receiving groove (58) while further displacing the sleeve (50) in the second circumferential direction (X direction).

Alternatively, the arrangement may be as follows. The sleeve actuating element-receiving groove (57') has an end wall surface (front ball-receiving groove end wall portion 57'b in the embodiment) that extends in the circumferential direction of the sleeve (50) and that rises from the inclined surface (57'a) to the inner peripheral surface of the sleeve (50). The locking element-receiving groove (58') is offset from the locking element (12b) in a direction opposite to the direction of insertion of the plug (30) when the sleeve (50) is placed in the predetermined position by the urging member (15). When the plug is inserted into the socket, the push portion (32) pushes the sleeve actuating element (12a) radially outward, so that the sleeve actuating element presses the inclined surface (57'a) to rotate the sleeve (50) in the second circumferential direction (X direction) and also presses the end wall surface (57'b) to move the sleeve (50) in the direction of insertion of the plug (30). When the sleeve (50) has been moved in the second circumferential direction (X direction) and in the plug insertion direction by the sleeve actuating element (12a), the locking element (12b) is pressed radially outward by the push portion (32) and pushed into the locking element-receiving groove (58').

In this case, the locking element-receiving groove (58') may have a first edge that extends in the plug insertion direction to define a boundary between the locking element-receiving groove and the locking surface (54c), so that when the sleeve (50) has been moved in the second circumferential direction (X direction) and in the plug insertion direction (Z direction) by the sleeve actuating element (12a), the locking element (12b) is pushed radially outward and pressed against the first edge of the locking element-receiving groove (58') by the push portion (32) of the plug (30) so as to enter the locking element-receiving groove (58') while further displacing the sleeve (50) in the second circumferential direction (X direction).

More specifically, the locking element-receiving groove (58') may have an end wall surface (rear ball-receiving groove end wall portion 58'b in the embodiment) extending in the circumferential direction of the sleeve at a position forward of the end wall surface of the sleeve actuating element-receiving groove (57') in the plug insertion direction, and a second edge that defines a boundary between the end wall surface (58'b) and the inner peripheral surface of the sleeve, so that when the sleeve (50) is moved in the second circumferential direction (X direction) and in the plug insertion direction (Z direction) by the sleeve actuating element (12a), the locking element (12b) pressed by the push portion (32) presses the first and second edges of the locking element-receiving groove (58') and enters the locking element-receiving groove (58') while displacing the sleeve (50) in the plug insertion direction and in the second circumferential direction.

Further, the socket according to the present invention may be arranged as follows. The sleeve (50) has a relief surface (59: see FIG. 11) that extends from the inner peripheral surface of the sleeve to the forward end of the sleeve and that has a larger radius than that of the inner peripheral surface. The relief surface (59) allows the locking element (12*b*) and the sleeve actuating element (12*a*) to be displaced radially outward when the sleeve (50) has been displaced in the plug insertion direction (Z direction), thereby allowing the plug (30) to be pulled out of the socket (10).

Specifically, the arrangement may be such that the inner peripheral surface of the sleeve is provided annularly in the circumferential direction of the socket, and the relief surface is provided annularly in the circumferential direction of the socket adjacently to the inner peripheral surface.

The above and other objects, features and advantages of the present invention will become more apparent from the following description of the preferred embodiments thereof, taken in conjunction with the accompanying drawings.

DESCRIPTION OF THE PREFERRED EMBODIMENTS

Embodiments in which the coupling according to the present invention is applied to a pipe coupling will be described below with reference to the accompanying drawings.

First Embodiment

A pipe coupling according to a first embodiment of the present invention will be explained below with reference to FIGS. 1 to 11.

Figure 1:
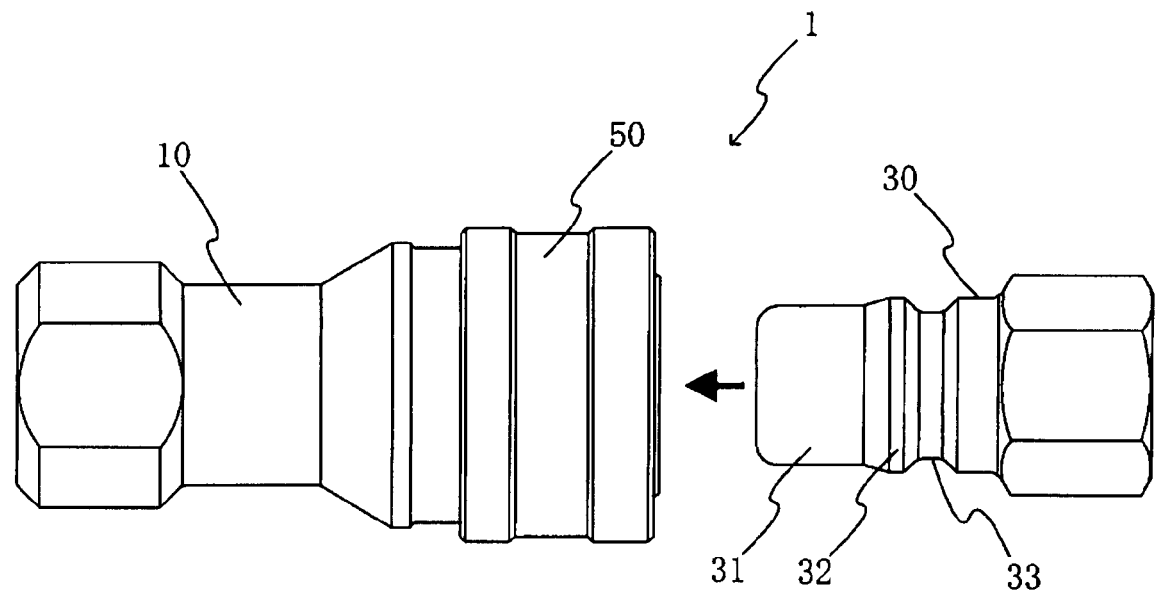
FIG. 1 is a side view of a pipe coupling comprising a socket and a plug according to a first embodiment of the present invention.

As shown in FIG. 1, a pipe coupling 1 has a tubular socket 10 and a plug 30 that is removably inserted into the socket 10.

The plug 30 has an insert part 31 that is inserted into the socket 10. The insert part 31 has an annular ball push portion 32 formed on the outer peripheral surface thereof. The insert part 31 further has a plug groove 33 at the rear of the ball push portion 32 with respect to the plug inserting direction.

Figure 2:
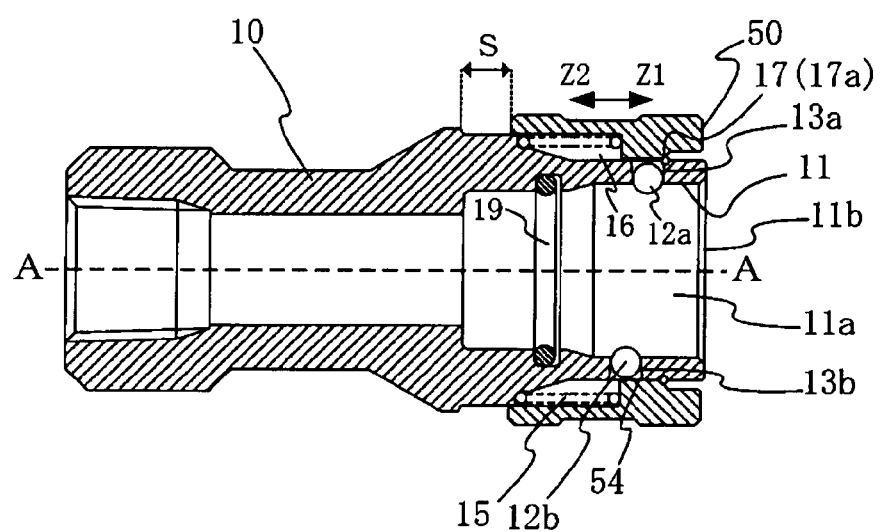
FIG. 2 is a longitudinal sectional view of the socket shown in FIG. 1.

As shown in FIG. 2, the socket 10 has a tubular plug-receiving part 11 with a plug-receiving space 11*a* that receives the insert part 31 of the plug 30, and has a plurality of front and rear ball-receiving holes 13*a* and 13*b* radially extending therethrough. The front ball-receiving holes 13*a* and 13*b* are located at a distance from a forward end opening edge 11*b* in sequence, from which the plug 30 is inserted, toward the rear end of the socket 10. The rear ball-receiving holes 13*b* are spaced apart from the front ball-receiving holes 13*a* toward the rear end of the socket 10. The front ball-receiving holes 13*a* and 13*b* are spaced from each other at a predetermined interval in the circumferential direction of the plug-receiving part 11.

The front ball-receiving holes 13a accommodate front balls (sleeve-actuating elements) 12a, and the rear ball-receiving holes 13b accommodate rear balls (locking elements) 12b. The front and rear ball-receiving holes 13a and 13b are each tapered from the outer peripheral surface toward the inner peripheral surface of the plug-receiving part 11 so as to be capable of retaining the front and rear balls 12a and 12b in such a way that a part of each ball projects into the plug-receiving space 11a.

Further, an annular seal 19 made of rubber is disposed in the plug-receiving part 11 at a position rearward (leftward) of the rear ball-receiving holes 13b. The annular seal 19 abuts against the outer peripheral surface of the insert part 31 of the plug 30 when the socket 10 and the plug 30 are connected to each other, to seal between the socket 10 and the plug 30.

A sleeve 50 is fitted over the outer peripheral surface of the plug-receiving part 11. The sleeve 50 is slidable in the axial direction A of the socket 10 only through a distance S shown in FIG. 2. A spring-accommodating space 16 is annularly formed between the inner peripheral surface of the sleeve 50 and the outer peripheral surface of the plug-receiving part 11 to accommodate a torsion coil spring (urging member) 15. The torsion coil spring 15 is retained at one end thereof in a hole (not shown) formed in the socket 10. The other end of the torsion coil spring 15 is retained in a spring-retaining groove 55 (see FIG. 4) formed in the sleeve 50.

A sleeve stopper 17 is secured to the plug-receiving part 11 to stop the sleeve 50 from further moving from position shown in FIG. 2 in an advancing direction Z1, thus preventing the sleeve 50 from falling out of the socket 10. The sleeve stopper 17 comprises an annular portion 17a (FIG. 2) and a straight-line portion 17b (FIG. 6b) extending in the axial direction A of the sleeve. The annular portion 17a of the sleeve stopper 17 is accommodated in an annular groove formed on the outer peripheral surface of the plug-receiving part 11. The straight-line portion 17b of the sleeve stopper 17 is disposed in a straight-line groove formed on the outer peripheral surface of the plug-receiving part 11 in parallel to the axial direction A, and engaged in a sleeve stopper-engaging groove 56 as shown in FIGS. 9b and 10b to limit the angle of rotation of the sleeve 50 within a predetermined angle range.

Figure 3:
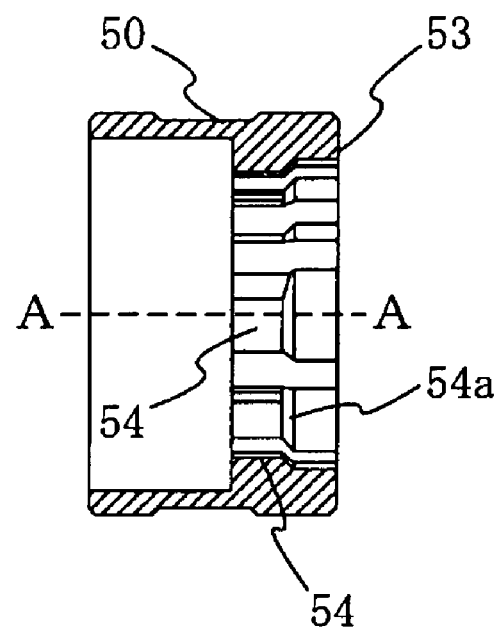
FIG. 3 is a longitudinal sectional view of a sleeve in the pipe coupling according to the first embodiment of the present invention.

As shown in FIG. 3, the sleeve 50 has a thick-walled portion at the right-hand side of spring-accommodating space 16. The thick-walled portion has a plurality of grooves extending parallel to the axial direction A from the right (forward) end 53 of the sleeve 50. An annular projection 54 is formed on the inner peripheral surface of the right-hand, thick-walled portion of the sleeve 50. A right end edge 54a of the annular projection 54 is adapted to abut against the annular portion 17a of the sleeve stopper 17.

Figure 4:
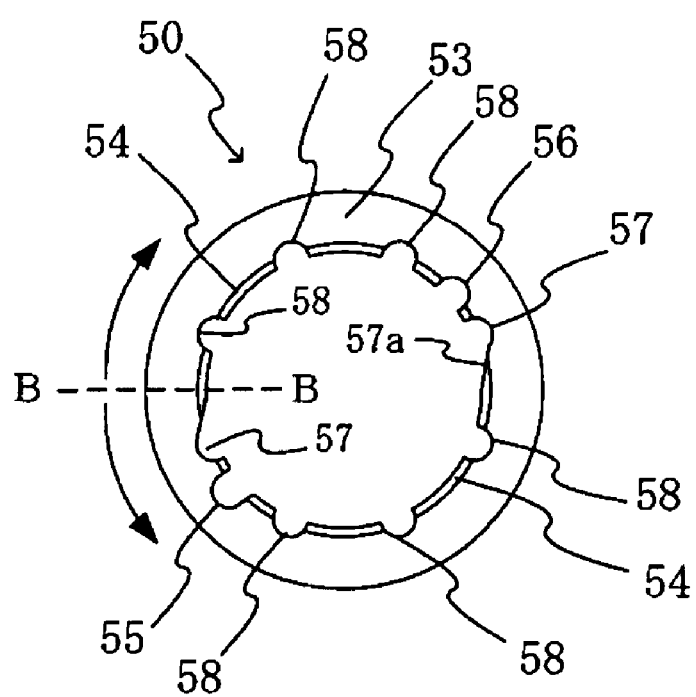
FIG. 4 is an end view of the sleeve in FIG. 3 as seen from a plug-inserting side.
Figure 5:
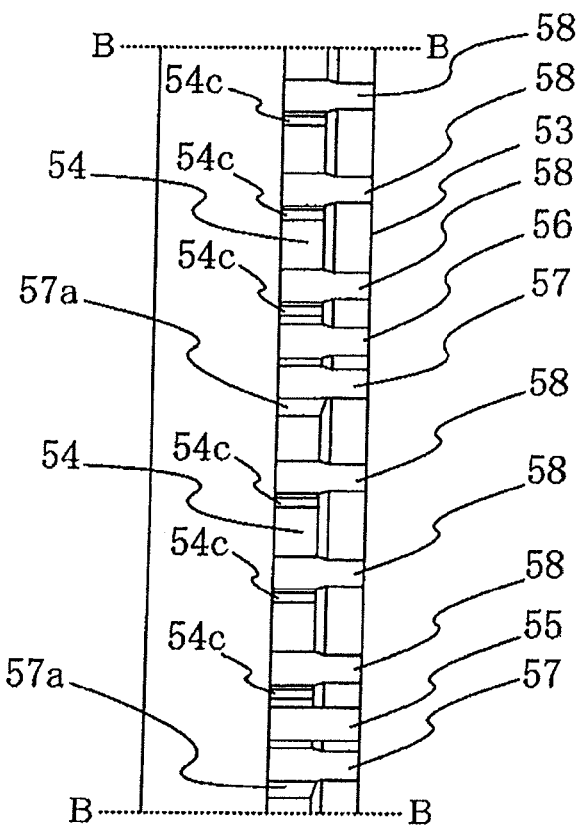
FIG. 5 is a development of the sleeve in FIG. 3 as sectioned along the line B-B and developed to show the inner peripheral surface thereof.
Figure 6:
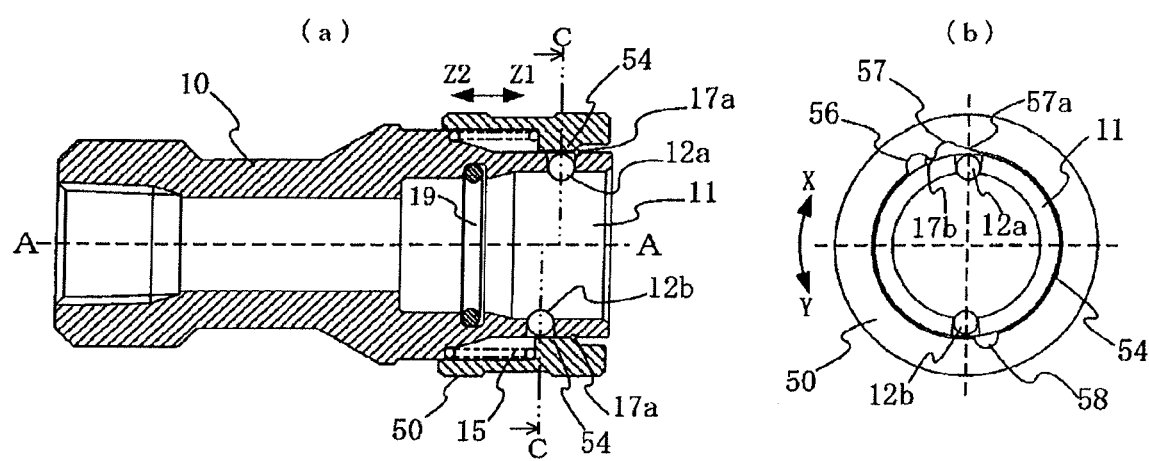
FIG. 6*a* is a longitudinal sectional view of the socket in FIG. 2, showing a state before the plug is inserted thereinto.
FIG. 6*b* is a sectional view as seen along the line C-C in FIG. 6*a*.

FIG. 5 is a development of the sleeve 50 as sectioned along the line B-B in FIG. 4 and developed to show the inner peripheral surface thereof in a planar configuration. As will be clear from FIG. 5, the sleeve 50 has the following grooves formed on the inner peripheral surface thereof to extend in the direction of the line B-B (i.e. the axial direction A): a spring-retaining groove 55 for retaining a bent portion of the torsion coil spring 15; a sleeve stopper-engaging groove 56 in which the straight-line portion 17b of the sleeve stopper 17 engages to limit the angle of rotation of the sleeve 50; front ball-receiving grooves 57 that receive the front balls 12a; and rear ball-receiving grooves 58 that receive the rear balls 12b. Each front ball-receiving groove 57 has a front ball-receiving groove inclined surface 57a gently sloped circumferentially from the inner peripheral surface of the annular projection 54 (as seen in FIG. 4).

Although not shown in FIG. 4, the annular projection 54 has locking surfaces 54c (FIG. 5) formed adjacent to the respective rear ball-receiving grooves 58 in the clockwise direction in FIG. 4. The locking surfaces 54c form grooves that are parallel to the inner peripheral surface of the annular projection 54 and shallower than the grooves 55 to 58. In a plug connected state (FIG. 10), which will be described later, the locking surfaces 54c lock the rear balls 12b from being displaced radially outward when a force is applied in a direction in which the plug 30 is disengageable from the socket 10, thereby preventing the plug 30 from falling out of the socket 10.

The following is a description of an operation of connecting the plug 30 to the socket 10 in the pipe coupling 1. For the sake of simplicity, in FIGS. 6a to 10b, illustration of grooves other than those necessary for explanation is omitted, and the circumferential angular relationship of the rear ball-receiving groove 58 to the sleeve stopper-engaging groove 56 and the front ball-receiving groove 57 is altered.

As shown in FIGS. 6a and 6b, before the plug is inserted into the socket 10, the sleeve 50 is urged in the advancing direction Z1 by the torsion coil spring 15 and retained by the annular portion 17a of the sleeve stopper 17. The front balls 12a and the rear balls 12b are pressed radially inward by the inner peripheral surface of the annular projection 54 of the sleeve so as to partially project into the plug-receiving space 11a.

FIGS. 7a and 7b show a state where the forward end of the plug 30 has been inserted into the plug-receiving part 11 of the socket 10. In this state, the annular inclined surface of the ball push portion 32 contacts the front balls 12a and starts to push the front balls 12a radially outward of the plug-receiving part 11.

As shown in FIG. 7b, each front ball 12a being pushed radially outward presses the front ball-receiving groove inclined surface 57a formed in the front ball-receiving groove 57 of the sleeve 50. This causes the sleeve 50 to rotate in the clockwise direction X shown in FIG. 7b. Consequently, the front ball 12a starts to roll on the front ball-receiving groove inclined surface 57a toward the front ball-receiving groove 57.

FIGS. 8a and 8b show a state where the plug 30 has been further inserted into the socket 10 from the position shown in FIGS. 7a and 7b. As shown in FIG. 8a, the front ball 12a has been substantially pushed out of the plug-receiving part 11 into the front ball-receiving groove 57 by the ball push portion 32, and the sleeve 50 has further rotated in the clockwise direction X.

Meanwhile, each rear ball 12b starts to be pressed radially outward of the plug-receiving part 11 by the inclined surface of the ball push portion 32. At this time, the rear ball 12b is radially in alignment with a rear ball-receiving groove edge 58q (i.e. the edge of the rear ball-receiving groove). Accordingly, the rear ball 12b presses the rear ball-receiving groove edge 58q and thus causes the sleeve 50 to rotate further in the clockwise direction X.

FIG. 9a shows a state where the plug 30 has been further inserted from the position shown in FIG. 8a. That is, when the ball push portion 32 of the plug 30 has passed beyond the front ball 12a, the front ball 12a starts to move into the annular plug groove 33. Meanwhile, the rear ball 12b is completely pushed out of the plug-receiving part 11 by the ball push portion 32.

FIGS. 10a and 10b show a state where the plug 30 has been further inserted from the position shown in FIGS. 9a and 9b to complete locking of the plug 30 in the socket 10. That is, the front ball 12a and the rear ball 12b have entered the plug groove 33. In this state, the front ball 12a and the rear ball 12b no longer press the sleeve 50 in the clockwise direction X. Consequently, the sleeve 50 rotates in the counterclockwise direction Y by the urging force of the torsion coil spring 15 into a lock position (where the sleeve 50 locks the plug in the socket).

In the lock position, as shown in FIG. 10a, the locking surface 54c (FIG. 5), which is adjacent to the rear ball-receiving groove 58, radially faces the rear ball 12b. Therefore, the rear ball 12b is prevented from becoming dislodged from the plug groove 33 even if a force is applied to the plug in the direction of pulling it out of the socket and consequently the ball push portion 32 urges the rear ball 12b to be pushed radially outward. Accordingly, the movement of the plug 30 in the direction of disengaging from the socket 10 is blocked by the rear ball 12b abutting against the inclined surface of the plug groove 33. Thus, the socket 10 and the plug 30 are kept in coupled relation.

Figure 10:
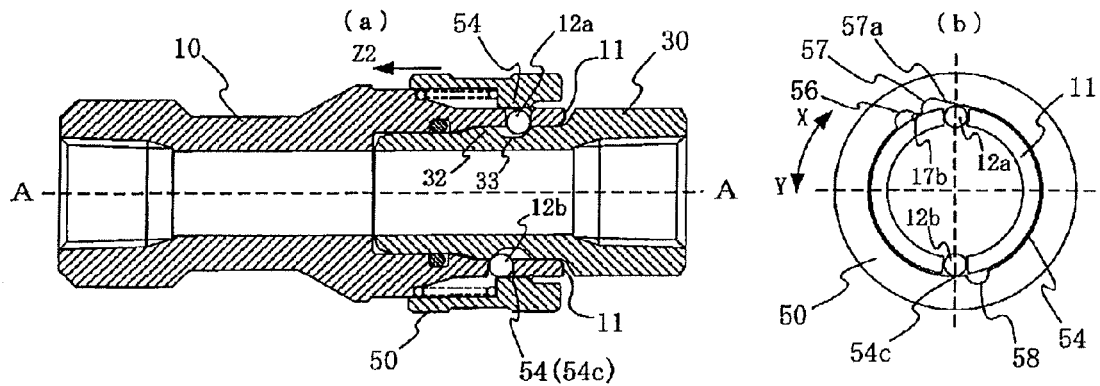
FIG. 10*a* is a longitudinal sectional view of the pipe coupling in a state where the plug has been further inserted into the socket from the position shown in FIG. 9*a* to complete the insertion of the plug.
FIG. 10*b* is a sectional view of the pipe coupling in FIG. 10*a* as seen along the same line as the line C-C in FIG. 6*a*.

The following is a description of an operation of removing the plug 30 from the socket 10 in the first embodiment. The plug 30 connected to the socket 10 as shown in FIG. 10 is removable from the socket 10 by conducting the following operation (1) or (2):

(1) In the state shown in FIG. 10b, the user rotates the sleeve 50 in the clockwise direction X against the urging force of the torsion coil spring 15. When the sleeve 50 returns to the position shown in FIG. 9b by rotating in the clockwise direction X, the rear ball-receiving groove 58 of the sleeve 50 align with the rear ball 12b, and the front ball-receiving groove 57 thereof aligns with the front ball 12a. If in this state the plug 30 is pulled in the direction of disengaging from the socket 10, the ball push portion 32 of the plug 30 causes the rear ball 12b and the front ball 12a to be successively pushed out of the plug groove 33 to unlock the plug 30, thereby allowing the plug to be pulled out of the socket 10.

Figure 11:
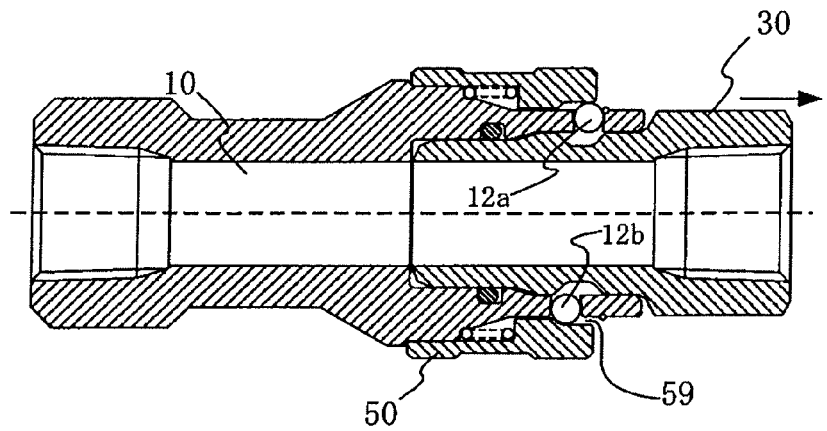
FIG. 11 is a sectional view showing a state where the sleeve has moved from the position shown in FIG. 10*a* to allow the plug to be disengaged from the socket.

(2) The sleeve 50 is moved in a retracting direction Z2 from the position shown in FIG. 10a to a position shown in FIG. 11. Consequently, the front ball 12a and the rear ball 12b align with the relief surface 59 of the sleeve (shown in FIG. 11). Thus, the front and rear balls 12a and 12b become movable radially outward. If in this state the plug 30 is pulled in the direction of disengaging from the socket 10, the ball push portion 32 of the plug 30 causes the rear and front balls 12b and 12a to successively move radially outwardly toward the relief surface 59 to unlock the plug 30, thereby allowing the plug 30 to be pulled out of the socket 10.

It should be noted that the stroke S of the sleeve 50 in the axial direction A can be increased by increasing the width in the axial direction A of the annular projection 54 of the sleeve 50. By so doing, the plug 30 can be prevented from undesirably falling out of the socket 10 even if the sleeve 50 is accidentally moved a little in the retracting direction Z2. The rear balls 12b remain facing the locking surfaces 54c of the annular projection 54 of the sleeve 50 to prevent the plug 30 from falling out of the socket 10, thereby allowing the plug 30 to be pulled out of the socket 10 only by rotation of the sleeve 50, even if the width in the axial direction A of the annular projection 54 of the sleeve 50 may be increased so that the sleeve 50 is moved to the maximum in the retracting direction Z2.

Second Embodiment

A second embodiment of the pipe coupling according to the present invention will be explained below with reference to FIGS. 12 to 18b. It should be noted that in the second embodiment the same constituent elements as those of the first embodiment are denoted by the same reference numerals as those used in the first embodiment, and a description thereof is omitted herein.

The pipe coupling of the second embodiment comprises a socket 10, a sleeve 50', and a plug 30. The pipe coupling is the same as the pipe coupling of the first embodiment except the sleeve 50'.

Figure 12:
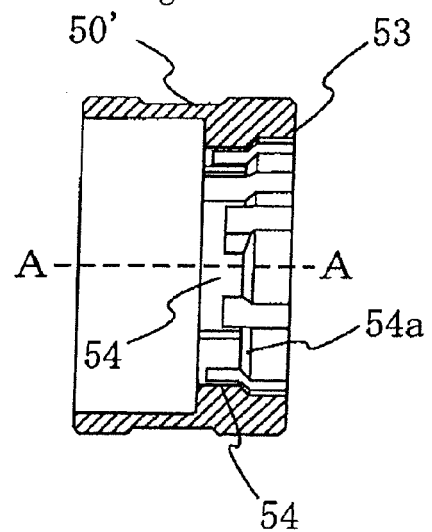
FIG. 12 is a sectional view of a sleeve in a pipe coupling according to a second embodiment of the present invention.
Figure 13:
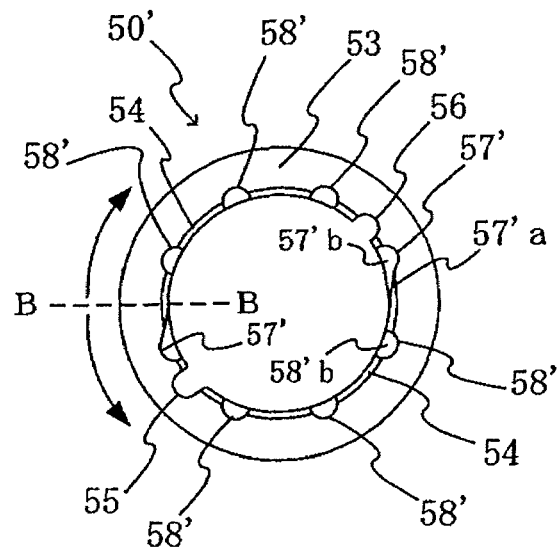
FIG. 13 is an end view of the sleeve in FIG. 12 as seen from the right-hand side thereof.
Figure 14:
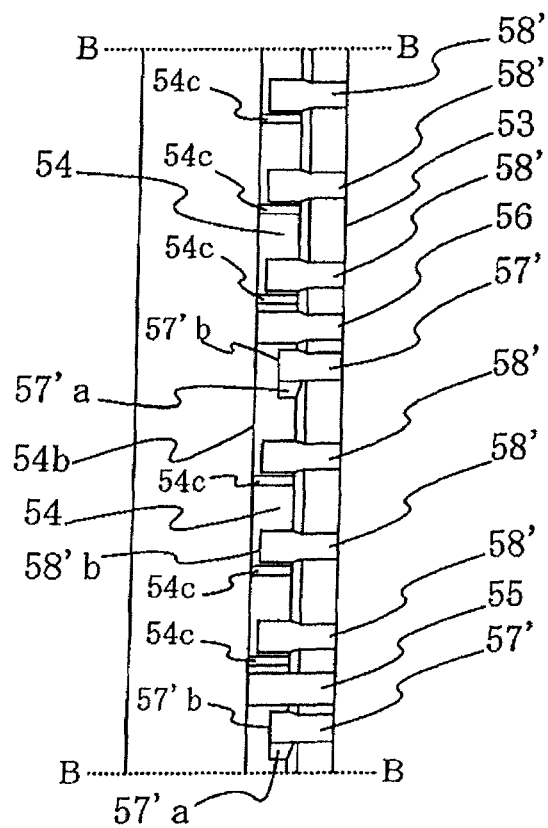
FIG. 14 is a development of the sleeve in FIG. 13 as sectioned along the line B-B and developed to show the inner peripheral surface thereof.
Figure 15:
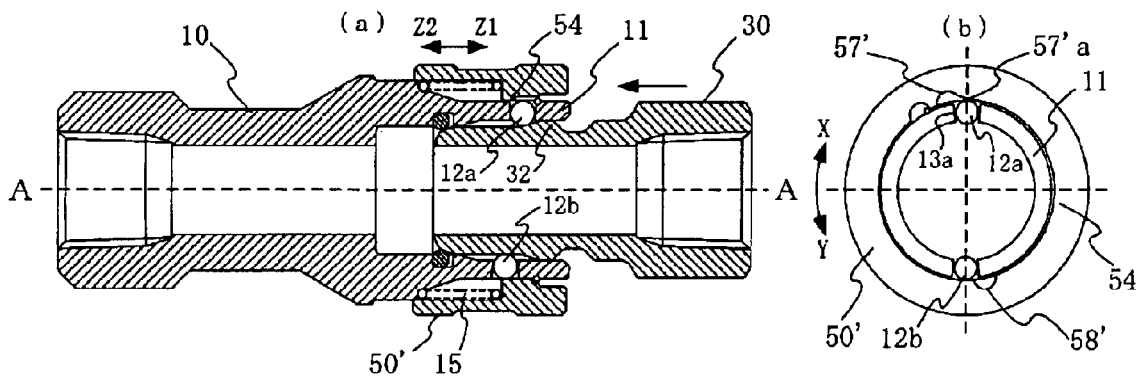
FIG. 15*a* is a longitudinal sectional view of the pipe coupling according to the second embodiment of the present invention, showing a state where the plug has begun to be inserted into the socket.
FIG. 15*b* is a sectional view similar to FIG. 6*b*, showing the pipe coupling in FIG. 15*a*.
Figure 16:
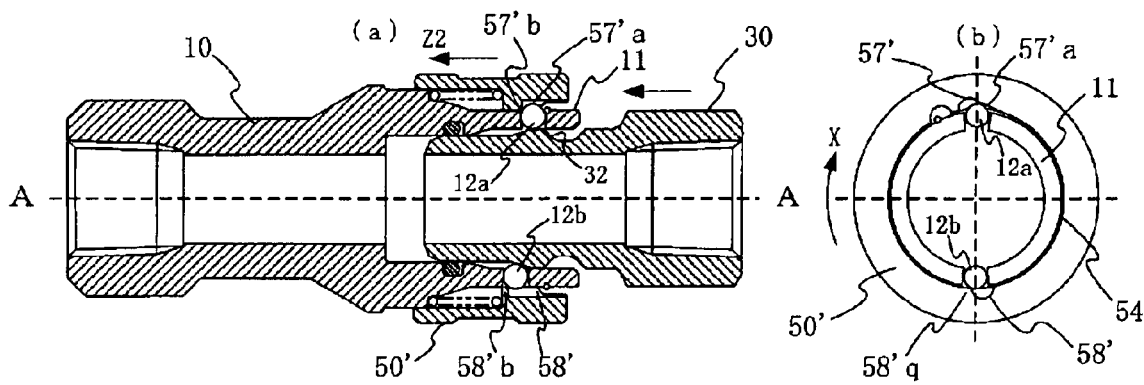
FIG. 16*a* is a longitudinal sectional view of the pipe coupling in a state where the plug has been further inserted into the socket from the position shown in FIG. 15*a*.
FIG. 16*b* is a sectional view similar to FIG. 6*b*, showing the pipe coupling in FIG. 16*a*.
Figure 17:
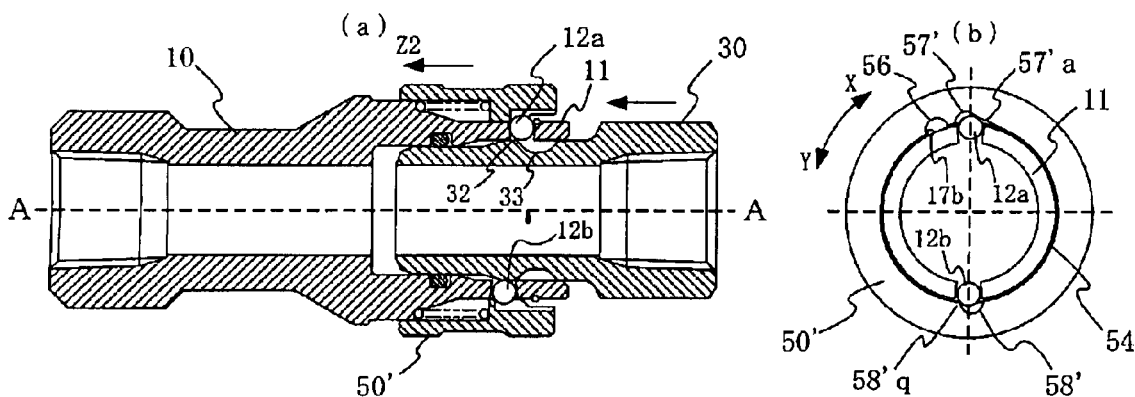
FIG. 17*a* is a longitudinal sectional view of the pipe coupling in a state where the plug has been further inserted into the socket from the position shown in FIG. 16*a*.
FIG. 17*b* is a sectional view similar to FIG. 6*b*, showing the pipe coupling in FIG. 17*a*.
Figure 18:
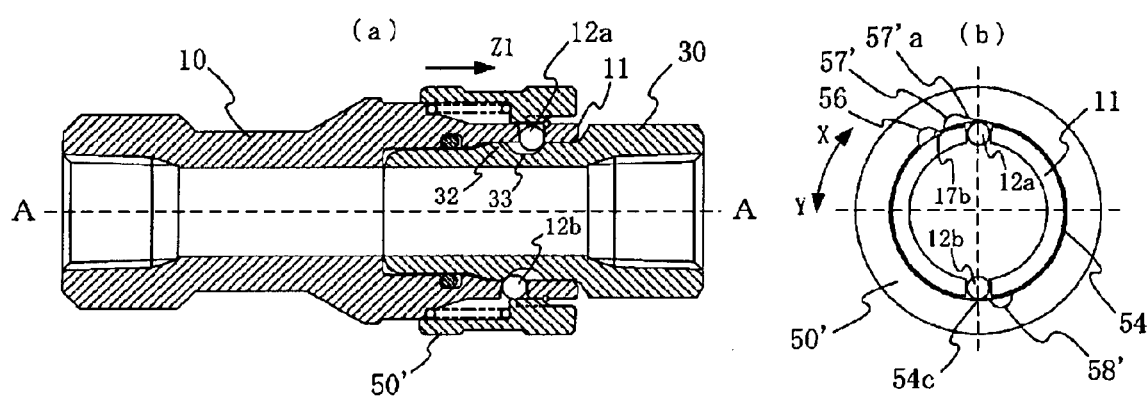
FIG. 18*a* is a longitudinal sectional view of the pipe coupling in a state where the plug has been further inserted into the socket from the position shown in FIG. 17*a* to complete the insertion.
FIG. 18*b* is a sectional view similar to FIG. 6*b*, showing the pipe coupling in FIG. 18*a*.

As shown in FIGS. 12 and 13, a tubular sleeve 50' has the following grooves formed on the inner peripheral surface thereof; front ball-receiving grooves 57' that accommodate the front balls 12a, respectively; front ball-receiving groove inclined surfaces 57'a sloped circumferentially from the inner peripheral surface of the annular projection 54 of the sleeve toward the front ball-receiving grooves 57', respectively; and rear ball-receiving grooves 58' that accommodate the rear balls 12b, respectively. The front ball-receiving grooves 57' and the rear ball-receiving grooves 58' extend rearward from the forward end 53 of the sleeve 50' as far as an intermediate portion of the annular projection 54, unlike in the first embodiment. Accordingly, front ball-receiving groove end wall portions 57'b and rear ball-receiving groove end wall portions 58'b are formed at the respective rear ends of the front and rear ball-receiving grooves 57' and 58'. As will be clear from FIG. 14, the length from the forward end 53 of the sleeve to each front ball-receiving groove end wall portion 57'b is shorter than the length from the sleeve forward end 53 to each rear ball-receiving groove end wall portion 58'b.

The connecting operation of the pipe coupling of the second embodiment will be explained below in detail with reference to FIGS. 7a and 15a to 18a.

Figure 7:
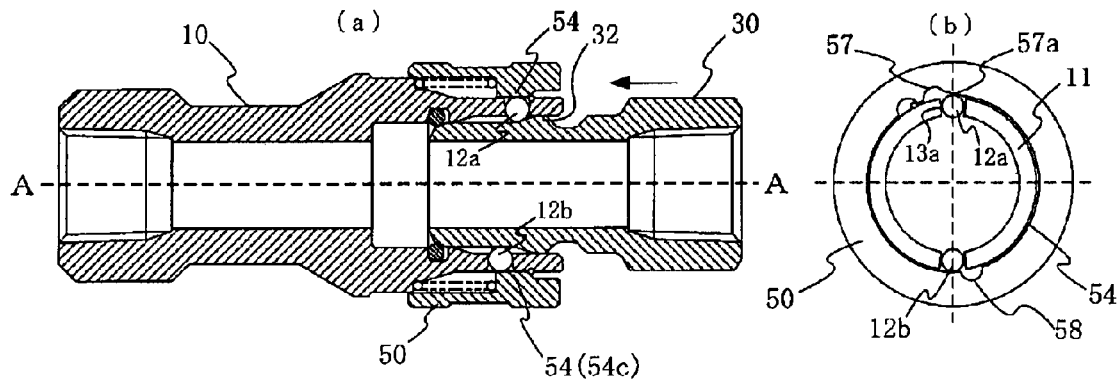
FIG. 7*a* is a longitudinal sectional view of the pipe coupling in a state where the plug has begun to be inserted into the socket.
FIG. 7*b* is a sectional view of the pipe coupling in FIG. 7*a* as seen along the same line as the line C-C in FIG. 6*a*.
Figure 8:
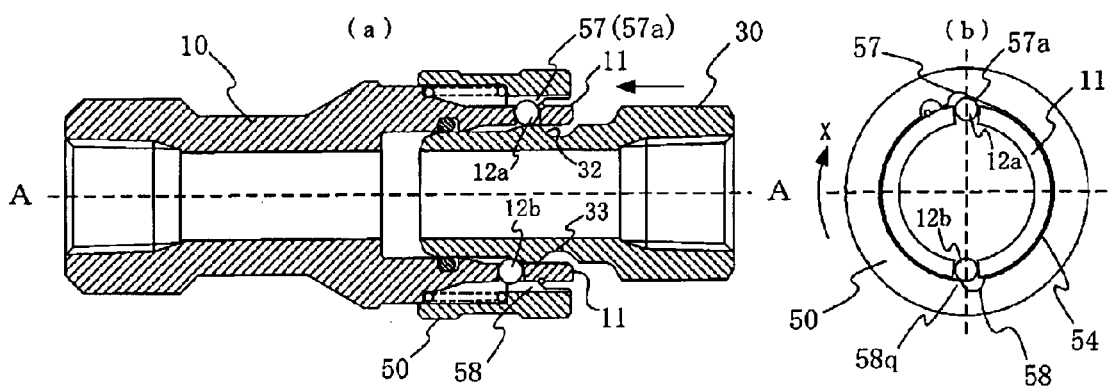
FIG. 8*a* is a longitudinal sectional view of the pipe coupling in a state where the plug has been further inserted into the socket from the position shown in FIG. 7*a*.
FIG. 8*b* is a sectional view of the pipe coupling in FIG. 8*a* as seen along the same line as the line C-C in FIG. 6*a*.
Figure 9:
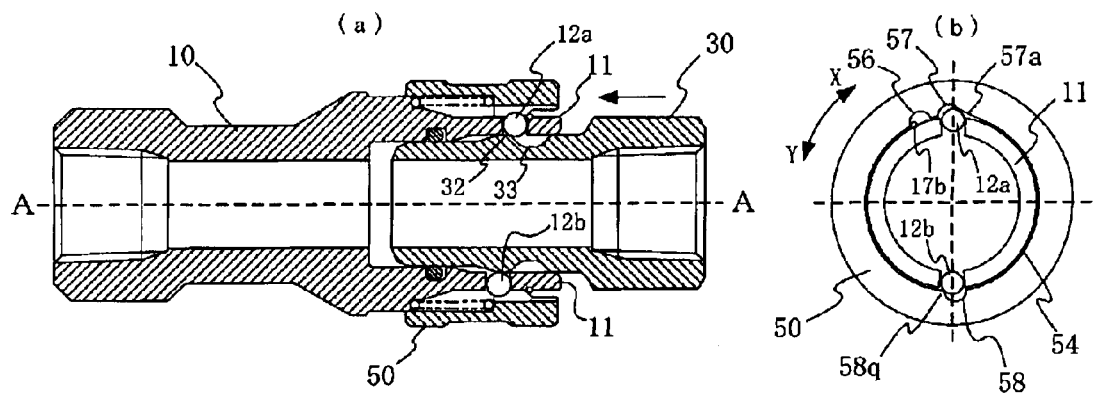
FIG. 9*a* is a longitudinal sectional view of the pipe coupling in a state where the plug has been further inserted into the socket from the position shown in FIG. 8*a*.
FIG. 9*b* is a sectional view of the pipe coupling in FIG. 9*a* as seen along the same line as the line C-C in FIG. 6*a*.

In a state where the plug 30 has begun to be inserted into the socket 10 in the pipe coupling of the second embodiment, the front balls 12a and the rear balls 12b are retained in such a way that a part of each ball projects into the plug-receiving space 11a, in the same way as shown in FIG. 7.

FIGS. 15a and 15b show a state where the plug 30 has begun to be inserted into the socket 10. As shown in FIG. 15a, each front ball 12a is pushed radially outward by the ball push portion 32 and begins to press the front ball-receiving groove inclined surface 57'a and the front ball-receiving groove end wall portion 57'b. This causes the sleeve 50' to rotate in the clockwise direction X while moving in the retracting direction Z2 shown in FIG. 16a against the urging force of the torsion coil spring 15 (see FIGS. 16a and 16b).

Each rear ball 12b is pushed radially outward by the ball push portion 32 of the plug that has been progressively inserted in this way, and press the radially inner edge of the rear ball-receiving groove end wall portion 58'b defining a border line relative to the locking surfaces 54c of the annular project 54 as well as a rear ball-receiving groove corner or edge 58'q.

FIGS. 17a and 17b show a state where the plug 30 has been further inserted from the position shown in FIGS. 16a and 16b. The front ball 12a, as shown in FIG. 17b, substantially aligns with the front ball-receiving groove 57', and the rear ball 12b substantially aligns with the rear ball-receiving grooves 58' that has moved to the illustrated position as a result of the rotation of the sleeve 50' in the clockwise direction X.

Although the rear ball-receiving groove 58' has no slope like on the inclined surface 57'a, the rear ball 12b thus pushed out presses the rear ball-receiving groove corner 58'q and the rear ball-receiving groove end wall portion 58'b, causing the sleeve 50' to further move in the clockwise direction X and also in the retracting direction Z2.

When the plug 30 is further inserted from the position shown in FIGS. 17a and 17b, the ball push portion 32 first passes beyond the front ball 12a, and the front ball 12a enters the plug groove 33. Then, the ball push portion 32 passes beyond the rear ball 12b, and the rear ball 12b enters the plug groove 33. Consequently, the sleeve 50' is caused by the urging force of the torsion coil spring 15 to rotate in the counterclockwise direction Y and to move in the advancing direction Z1 into a lock position as shown in FIGS. 18a and 18b. Even if the sleeve is rotated in the clockwise direction X against the urging force of the torsion coil spring 15, the plug 30 cannot be unlocked because the rear ball 12b radially aligns with the locking surface 54c of the annular projection 54 of the sleeve.

When the plug is to be removed from the socket in the pipe coupling of the second embodiment, the sleeve is moved in the retracting direction $Z_2$ against the urging force of the torsion coil spring 15. Consequently, the relief surface 59 of the sleeve 50' radially aligns with the front and rear balls 12a and 12b, thereby enabling the front and rear balls 12a and 12b to be displaced radially outward, and thus allowing the plug to be pulled out of the socket 10.

The width in the axial direction A of the annular projection 54 of the sleeve 50' may be increased so that even if the sleeve 50' is moved to the maximum in the retracting direction Z2, the plug 30 will not fall out of the socket 10. In this case, the plug 30 can be pulled out of the socket 10 by rotating the sleeve 50' in the clockwise direction X to align the rear balls 12b and the rear ball-receiving grooves 58' in the axial direction A and moving the sleeve 50' in the retracting direction Z2 to align the rear balls 12b and the rear ball-receiving grooves 58' in the radial direction. Because in this case two actions are required to remove the plug 30, there will be a reduced possibility of the plug 30 being undesirably pulled out of the socket 10 by an erroneous operation.

Figure 19:
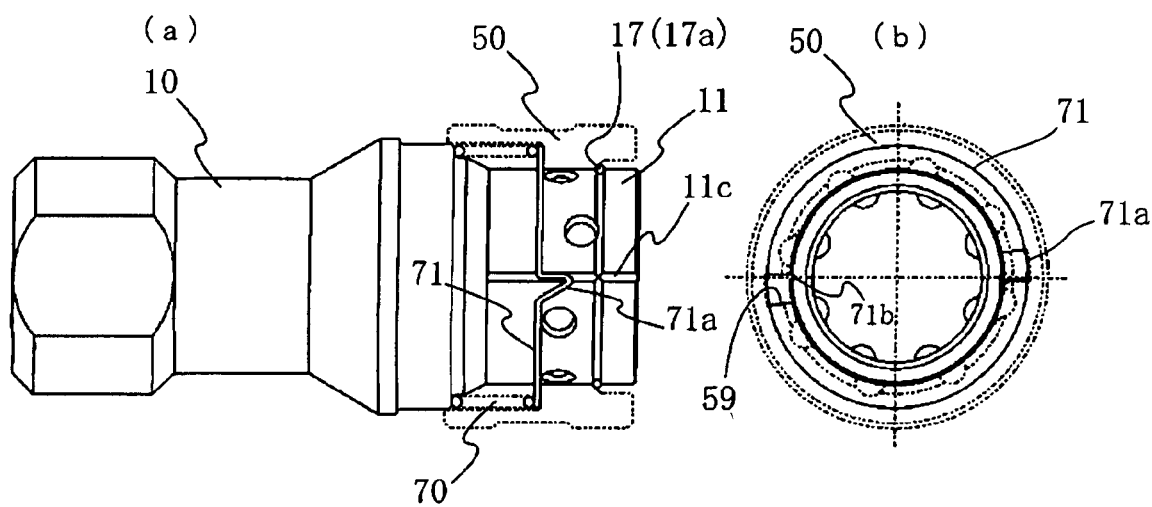
FIG. 19*a* is a side view showing a modification of the socket of the pipe coupling according to the present invention, in which illustration of a sleeve is omitted.
FIG. 19*b* is a right-hand end view of the socket shown in FIG. 19*a*.

FIG. 19 shows a modification of the embodiment shown in FIGS. 1 and 2.

In this modification, the socket 10 is provided with a coil spring 70 that urges the sleeve 50 in the advancing direction Z1 and a plate spring member 71 that urges the sleeve 50 in the counterclockwise direction Y, in place of the torsion coil spring 15.

The plate spring member 71 is of an annular shape as a whole and has a substantially V-shaped projecting spring portion 71a in a circumferential region thereof. The spring portion 71a comprises an axially extending portion and an obliquely extending portion. An axial groove 11c is formed on the plug-receiving part 11 of the socket 10, and a projection 71b formed on the axially extending portion of the spring portion 71a is fitted in the axial groove 11c to restrain the rotation of the plate spring member 71. In addition, a groove 59 is formed on the inner peripheral surface of the sleeve 50 in parallel to the axial direction A to receive the spring portion 71a, so that when the sleeve 50 rotates clockwise, the spring portion 71a is elastically deformed to generate restoring force in the counterclockwise direction Y.

In this modification, mutually independent members are used to apply urging force to the sleeve 50 in the advancing direction Z1 (i.e. urging force from the spring 70) and to apply urging force to the sleeve 50 in the counterclockwise direction Y (i.e. urging force from the plate spring member 71). Therefore, it becomes easy to adjust these urging forces independently of each other.

Although in the foregoing first and second embodiments the coupling of the present invention is applied to a pipe coupling, the application of the present invention is not limited to the pipe coupling. The present invention is also applicable to a fastening coupling used to fasten an article that is disclosed, for example, in Japanese Patent Application Publication Nos. 2005-351348 and 2001-182726 and Japanese Utility Model Application Publication No. Sho 55-113620.

What is claimed is:

1. A coupling comprising:
 a socket; and
 a plug that is inserted into and connected to said socket;
 said socket comprising:
 a tubular plug-receiving part extending rearward from a forward end adapted to receive said plug, said plug-receiving part having an inner peripheral surface and an outer peripheral surface;
 a sleeve actuating element-accommodating hole extending through said plug-receiving part in a radial direction thereof;
 a sleeve actuating element accommodated in said sleeve actuating element-accommodating hole displaceably in said radial direction;
 a locking element-accommodating hole extending through said plug-receiving part in said radial direction at a position closer to a rear end of said socket than said sleeve actuating element-accommodating hole;
 a locking element accommodated in said locking element-accommodating hole displaceably in said radial direction;
 a sleeve fitted over said outer peripheral surface; and
 an urging member that urges said sleeve toward a predetermined position on said socket;
 said plug comprising:
 a push portion formed on an outer surface of said plug to successively push said sleeve actuating element and said locking element radially outward when said plug is inserted into the plug-receiving part of said socket; and
 a plug groove formed on the outer surface of said plug rearwardly adjacent to said push portion in a direction of insertion of said plug to receive said sleeve actuating element and said locking element;
 said sleeve having an inner peripheral surface that is slidably engaged with the outer peripheral surface of said plug-receiving part;
 said inner peripheral surface of said sleeve having:
 a locking surface that, when said sleeve is placed in said predetermined position by said urging member, radially aligns and engages with said locking element to retain it in such a way that a part of said locking element projects inward from the inner peripheral surface of said plug-receiving part;
 a sleeve actuating element-receiving groove having an inclined surface which slopes outward from a first portion towards a second portion which is positioned apart from said first portion in a first circumferential direction of said sleeve such that, when said sleeve is placed in said predetermined position by said urging member, said first portion radially aligns with said sleeve actuating element wherein in response to said inclined surface being pressed radially outward by said sleeve actuating element, said sleeve is forced to rotate so that said second portion is rotationally displaced toward said sleeve actuating element in a second circumferential direction opposite to said first circumferential direction; and
 a locking element-receiving groove adjacent to said locking surface in said first circumferential direction;
 wherein when said plug is inserted into the plug-receiving part of said socket, said push portion pushes said sleeve actuating element radially outward and presses it against said inclined surface, thereby rotationally displacing said sleeve in said second circumferential direction, and thus causing said sleeve actuating element to be displaced from said first portion toward said second portion relative to said inclined surface, and while doing so, said push portion further advances in said plug-receiving part to push said locking element radially outward into said locking element-receiving groove, and when said plug has been inserted into said plug-receiving part by a predetermined length, said locking element and sleeve actuating element are received in said plug groove, thereby allowing said sleeve to be returned to said predetermined position by said urging member.

2. The coupling of claim 1, wherein said locking element-receiving groove has an edge that extends in the direction of insertion of said plug to define a boundary between said locking element-receiving groove and said locking surface, so that when said sleeve has been displaced in said second circumferential direction by said sleeve actuating element, said locking element is pushed radially outward and pressed against said edge of said locking element-receiving groove by said push portion of said plug so as to enter said locking element-receiving groove while further displacing said sleeve in said second circumferential direction.

3. The coupling of claim 1, wherein said sleeve actuating element-receiving groove has an end wall surface that extends in a circumferential direction of said sleeve and that rises from said inclined surface to the inner peripheral surface of said sleeve;

said locking element-receiving groove being offset from said locking element in a direction opposite to the direction of insertion of said plug when said sleeve is placed in said predetermined position by said urging member; whereby when said plug is inserted into said socket, said push portion pushes said sleeve actuating element radially outward, so that said sleeve actuating element presses said inclined surface to rotate said sleeve in said second circumferential direction and also presses said end wall surface to move said sleeve in the direction of insertion of said plug, and when said sleeve has been moved in said second circumferential direction and in the direction of insertion of said plug by said sleeve actuating element, said locking element is pressed radially outward by said push portion and pushed into said locking element-receiving groove.

4. The coupling of claim 3, wherein said locking element-receiving groove has a first edge that extends in the direction of insertion of said plug to define a boundary between said locking element-receiving groove and said locking surface, so that when said sleeve has been moved in said second circumferential direction and in the direction of insertion of said plug by said sleeve actuating element, said locking element is pushed radially outward and pressed against said first edge of said locking element-receiving groove by said push portion of said plug so as to enter said locking element-receiving groove while further displacing said sleeve in said second circumferential direction.

5. The coupling of claim 4, wherein said locking element-receiving groove has an end wall surface extending in the circumferential direction of said sleeve at a position forward of said end wall surface of said sleeve actuating element-receiving groove in the direction of insertion of said plug, and a second edge that defines a boundary between said end wall surface of said locking element-receiving groove and the inner peripheral surface of said sleeve, so that when said sleeve has been moved in said second circumferential direction and in the direction of insertion of said plug by said sleeve actuating element, said locking element pressed by said push portion presses said first edge and second edge of said locking element-receiving groove and enters said locking element-receiving groove while displacing said sleeve in the direction of insertion of said plug and in said second circumferential direction.

6. The coupling of claim 3, wherein said sleeve has a relief surface that extends from said inner peripheral surface thereof to the forward end of said sleeve and that has a larger radius than that of said inner peripheral surface thereof; and said relief surface allows said locking element and said sleeve actuating element to be displaced radially outward when said sleeve has been displaced in the direction of insertion of said plug, thereby allowing said plug to be pulled out of said socket.

7. The coupling claim 6, wherein said inner peripheral surface of said sleeve is provided annularly in a circumferential direction of said socket;

said relief surface being provided annularly in the circumferential direction of said socket adjacent to said inner peripheral surface.

8. The coupling of claim 1, wherein said sleeve has a relief surface that extends from said inner peripheral surface to the forward end of said sleeve and that has a larger radius than that of said inner peripheral surface; and said relief surface allows said locking element and said sleeve actuating element to be displaced radially outward when said sleeve has been displaced in the direction of insertion of said plug, thereby allowing said plug to be pulled out of said socket.

9. A socket of a coupling which comprises the socket and a plug that is inserted into and connected to the socket;

said socket comprising:

a tubular plug-receiving part extending rearward from a forward end of said socket to receive said plug, said plug-receiving part having an inner peripheral surface and an outer peripheral surface;

a sleeve actuating element-accommodating hole extending through said plug-receiving part in a radial direction thereof;

a sleeve actuating element accommodated in said sleeve actuating element-accommodating hole displaceably in said radial direction;

a locking element-accommodating hole extending through said plug-receiving part in said radial direction at a position closer to a rear end of said socket than said sleeve actuating element-accommodating hole;

a locking element accommodated in said locking element-accommodating hole displaceably in said radial direction;

a sleeve fitted over said outer peripheral surface; and an urging member that urges said sleeve toward a predetermined position on said socket;

said plug comprising:

a push portion formed on an outer surface of said plug to successively push said sleeve actuating element and said locking element radially outward when said plug is inserted into the plug-receiving part of said socket; and a plug groove formed on the outer surface of said plug rearwardly adjacent to said push portion in a direction of insertion of said plug to receive said sleeve actuating element and said locking element;

wherein said sleeve has an inner peripheral surface that is slidably engaged with the outer peripheral surface of said plug-receiving part;

said inner peripheral surface of said sleeve having:

a locking surface that, when said sleeve is placed in said predetermined position by said urging member, radially aligns and engages with said locking element to retain it in such a way that a part of said locking element projects inward from the inner peripheral surface of said plug-receiving part;

a sleeve actuating element-receiving groove having a first portion that, when said sleeve is placed in said predetermined position by said urging member, radially aligns and engages with said sleeve actuating element to cause a part of said sleeve actuating element to project radially inward from the inner peripheral surface of said plug-receiving part, a second portion positioned apart from said first portion in a first circumferential direction of said sleeve and radially outward of said first portion, and an inclined surface sloped radially outward from said first portion toward said second portion, wherein in response to said inclined surface being pressed radially outward by said sleeve actuating element, said sleeve is forced to rotate so that said second portion is rotationally displaced toward said sleeve actuating element in a second circumferential direction opposite to said first circumferential direction; and a locking element-receiving groove adjacent to said locking surface in said first circumferential direction;

wherein when said plug is inserted into the plug-receiving part of said socket, said sleeve actuating element is pushed radially outward and pressed against said inclined surface by said push portion of said plug, thereby rotationally displacing said sleeve in said second circumferential direction, and thus causing said sleeve actuating element to be displaced from said first portion toward said second portion relative to said inclined surface, and said locking element is pushed radially outward by said push portion of said plug inserted progressively while pushing said sleeve actuating element radially outward, and when said plug has been inserted into said plug-receiving part by a predetermined length, said sleeve actuating element and said locking element are received in said plug groove, thereby allowing said sleeve to be returned to said predetermined position by said urging member.

10. The socket of claim 9, wherein said locking element-receiving groove has an edge that extends in the direction of insertion of said plug to define a boundary between said locking element-receiving groove and said locking surface, so that when said sleeve has been displaced in said second circumferential direction by said sleeve actuating element, said locking element is pushed radially outward and pressed against said edge of said locking element-receiving groove by said push portion of said plug so as to enter said locking element-receiving groove while further displacing said sleeve in said second circumferential direction.

11. The socket of claim 9, wherein said sleeve actuating element-receiving groove has an end wall surface that extends in a circumferential direction of said sleeve and that rises from said inclined surface to the inner peripheral surface of said sleeve;

said locking element-receiving groove being offset from said locking element in a direction opposite to the direction of insertion of said plug when said sleeve is placed in said predetermined position by said urging member;

whereby when said plug is inserted into said socket, said push portion pushes said sleeve actuating element radially outward, so that said sleeve actuating element presses said inclined surface to rotate said sleeve in said second circumferential direction and also presses said end wall surface to move said sleeve in the direction of insertion of said plug, and when said sleeve has been moved in said second circumferential direction and in the direction of insertion of said plug by said sleeve actuating element, said locking element is pressed radially outward by said push portion and pushed into said locking element-receiving groove.

12. The socket of claim 11, wherein said locking element-receiving groove has a first edge that extends in the direction of insertion of said plug to define a boundary between said locking element-receiving groove and said locking surface, so that when said sleeve has been moved in said second circumferential direction and in the direction of insertion of said plug by said sleeve actuating element, said locking element is pushed radially outward and pressed against said first edge of said locking element-receiving groove by the push portion of said plug so as to enter said locking element-receiving groove while further displacing said sleeve in said second circumferential direction.

13. The socket of claim 12, wherein said locking element-receiving groove has an end wall surface extending in the circumferential direction of said sleeve at a position forward of said end wall surface of said sleeve actuating element-receiving groove in the direction of insertion of said plug, and a second edge that defines a boundary between said end wall surface of said locking element-receiving groove and the inner peripheral surface of said sleeve, so that when said sleeve is moved in said second circumferential direction and in the direction of insertion of said plug by said sleeve actuating element, said locking element pressed by said push portion presses said first edge and second edge of said locking element-receiving groove and enters said locking element-receiving groove while displacing said sleeve in the direction of insertion of said plug and in said second circumferential direction.

14. The socket of claim 11, wherein said sleeve has a relief surface that extends from said inner peripheral surface to the forward end of said plug-receiving part and that has a larger radius than that of said inner peripheral surface; and said relief surface allows said locking element and said sleeve actuating element to be displaced radially outward when said sleeve is displaced in the direction of insertion of said plug, thereby allowing said plug to be pulled out of said socket.

15. The socket of claim 14, wherein said inner peripheral surface of said sleeve is provided annularly in a circumferential direction of said socket; said relief surface being provided annularly in the circumferential direction of said socket adjacent to said inner peripheral surface.

16. The socket of claim 9, wherein said sleeve has a relief surface that extends from said inner peripheral surface to the forward end of said sleeve and that has a larger radius than that of said inner peripheral surface; and said relief surface allows said locking element and said sleeve actuating element to be displaced radially outward when said sleeve has been displaced in the direction of insertion of said plug, thereby allowing said plug to be pulled out of said socket.

* * * * *